H. DAMKÖHLER & H. SCHWINDT.
PROCESS OF ELECTROLYTICALLY TREATING TANNIC INFUSIONS OF PLANTS.
APPLICATION FILED JUNE 16, 1909.
975,835. Patented Nov. 15, 1910.
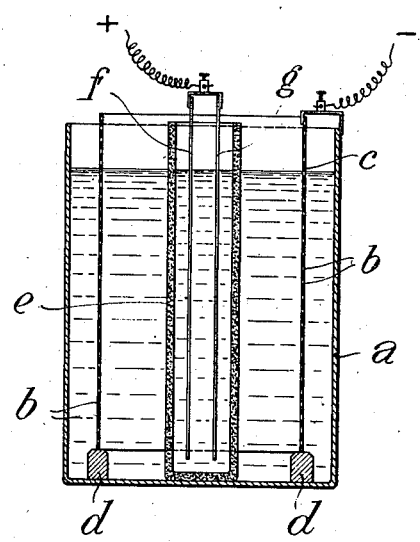
Witnesses
Inventors
HERMANN DAMKÖHLER
HUGO SCHWINDT

UNITED STATES PATENT OFFICE.

HERMANN DAMKÖHLER AND HUGO SCHWINDT, OF BREMEN, GERMANY.

PROCESS OF ELECTROLYTICALLY TREATING TANNIC INFUSIONS OF PLANTS.

975,835.  Specification of Letters Patent.  Patented Nov. 15, 1910.

Application filed June 16, 1909. Serial No. 502,423.

*To all whom it may concern:*

Be it known that we, HERMANN DAMKÖHLER, apothecary, and HUGO SCHWINDT, apothecary, citizens of the German Empire, residing at Bremen, Germany, have invented new and useful Improvements in a Process of Electrically Treating Tannic Infusions of Plants, of which the following is a specification.

Our invention relates to improvements in a process of electrically treating tannic infusions of plants, particularly of the bark of the mangrove, which are used in the manufacture of leather. These infusions, for example those which are obtained from the bark of the mangrove which are particularly rich in tannic acid, often contain red-brown dye stuffs which in the tanning process impart a non-uniform color to the leather which impairs its quality. Efforts have heretofore been made to remove these dye stuffs from the said infusions by subjecting the same to the electrolysis. However, these efforts have proved unsatisfactory, because either the dye stuffs were not sufficiently deposited by the said process, or a considerable amount of the tannic acid was simultaneously removed, so that the value of the tannic infusions was decreased. The object of our improvements is to provide a process, whereby the said dye stuffs can be removed from the infusions in a degree which is sufficient for practical purposes, without, however, impairing the quality of the infusions. And we have discovered, that this can be done by the aforesaid electrical process, if to the electrolytic baths used for treating the said infusions metallic salts are added the metals of which are the same as those of the electrodes.

When treating the infusion within such a cell, the electrolytic hydrogen which is liberated is in *statu nascendi* and seems to have a reducing action on the dye stuffs contained within the infusion, so that the said dye stuffs are deposited. The fact that the hydrogen is an important factor in the process may be recognized from the fact, that at the end of the process hydrogen is set free.

In the preferred mode of carrying the process into effect both electrodes are made of aluminum and zinc, the anode is separated from the cathode by a porous partition wall, and the electrolyte surrounding the anode as well as the solution added to the tannic infusion surrounding the cathode both consist of a solution of a sulfate of aluminum and of a sulfate of zinc.

For the purpose of explaining the invention, an example of an apparatus adapted for carrying the same into effect has been illustrated in the accompanying drawing, the figure showing a vertical cross-section of the apparatus.

Within a receptacle $a$ of zinc designed to receive the tannic infusion to be treated an aluminum cylinder $c$ having perforations $b$ is located which is preferably supported on insulating feet $d$, and which at its top is electrically connected with the receptacle $a$ of zinc. Within the aluminum cylinder $c$ a cylinder $e$ of clay is supported on the bottom of the cylinder $a$ within which a strip $f$ of zinc and a strip $g$ of aluminum are located one beside the other which at their upper ends are electrically connected with each other. The receptacle $a$ of zinc and the cylinder $c$ of aluminum form the cathode, while the strip $f$ of zinc and the strip $g$ of aluminum form the anode.

Into the receptacle $a$ of zinc the tannic infusion is brought, which preferably contains about 15% of tannic acid, which amount however can be increased so far, that the infusion permits the deposits to be precipitated or to be removed by centrifugal action. To the tannic infusion an amount of a solution of a sulfate of aluminum and of zinc is added which corresponds to the intensity of the dye stuff, which solution assists in the formation of a deposit. The cell $e$ of clay is filled with soft water having a small amount of aluminum and zinc sulfate dissolved therein, so that both electrodes $a$, $c$ and $f$, $g$ are in solutions of the salts containing their own metals.

When treating an infusion of the dark colored bark of the mangrove, the following amounts by weight of the ingredients have proved satisfactory: For 1 kilogram of the dry tannin a solution of about 10 grams of the sulfate of aluminum and of 0.3 gram of the sulfate of zinc in water is used. For filling the cylinder $e$ of clay a solution of 1 or 2 grams of aluminum sulfate and 0.3 gram of zinc sulfate in 1000 grams of water is sufficient. In the electrolysis of the tannic infusion within the cell the acids of both salts added thereto and of other salts contained therein pass into the cylinder $e$ of clay, while the tannic acid does not pass through the same. At the cathode $a$, $c$ the deposits are formed which contain a part of the dye stuffs which are injurious in the manufacture of leather, while another part of the said dye stuffs remains within the infusion and is lightened by reduction.

If in the course of carrying out the process filtered samples taken from the solution do not show a further lightening, and if in the solution only minute amounts of sulfuric acid are found, the electrolysis is stopped, the tannic infusion is cleared in the usual manner and vaporized to the desired consistency.

The deposit precipitated from the infusion and containing the dye stuffs does not contain any material amount of tannin, as is proved by the fact, that a solution of the same has no tanning action at all.

In carrying out the process, we have found, that a part of the non-tannic substances contained in the infusion is transformed into tannin.

The metal used as electrodes in our improved process depends on the metallic combination of the electrolyte, and the arrangement of the electrodes and the construction of the porous partition wall provided between the anode and the cathode can be varied according to the construction of the cell, without departing from our invention.

We claim:

1. The herein described process of treating tannic infusions of plants, such for example as the bark of the mangrove, which consists in subjecting the said infusions to the electrolysis within a cell, in which the tannic infusion forms a bath for the cathode which is separated from the anode by a porous partition wall, and in which the baths for the electrodes contain solutions of metal salts the metals of which are those of the electrodes.

2. The herein described process of treating tannic infusions of plants, for example those obtained from the bark of the mangrove, which consists in subjecting the said infusions to the electrolysis within a cell the anode and cathode of which both consist of aluminum and zinc, and the electrolytes contain a solution of a sulfate of aluminum and sulfate of zinc.

3. The process of treating extracts containing tannin, which consists in subjecting them to electrolysis in the presence of dissolved salts of the metals of which the electrodes are composed.

4. The process of treating extracts containing tannin, which consists in subjecting them to electrolysis with electrodes each of which consists of a plurality of metals and in the presence of dissolved salts of the metals of which the electrodes are composed.

5. The process of treating extracts containing tannin, which consists in separating such extracts by a porous wall and subjecting them to electrolysis in the presence of dissolved salts of the metals composing the electrodes.

6. The process for treating extracts containing tannin, which consists in separating such extracts by a porous wall from a solution of aluminum sulfate and zinc sulfate, adding a mixture of the same solutions to the extracts and subjecting them to electrolysis with electrodes each of which is composed of aluminum and zinc.

7. An electrolytic apparatus comprising a zinc container, an aluminum member connected therewith electrically and forming the cathode with said container, a porous cell, and an anode composed of zinc and aluminum and arranged to dip into such porous cell.

In testimony whereof we hereunto affix our signatures in the presence of two witnesses.

HERMANN DAMKÖHLER.
HUGO SCHWINDT.

Witnesses:
ERNST DREWITZ,
FERDINAND REICH.